US006782430B1

(12) United States Patent
Cragun

(10) Patent No.: US 6,782,430 B1
(45) Date of Patent: Aug. 24, 2004

(54) INVALID LINK RECOVERY

(75) Inventor: Brian John Cragun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 944 days.

(21) Appl. No.: 09/090,698

(22) Filed: Jun. 5, 1998

(51) Int. Cl.[7] .............................................. G06F 15/16
(52) U.S. Cl. ..................................... 709/245; 709/238
(58) Field of Search ................................ 709/245, 219, 709/231, 238; 707/501, 502, 513, 530; 713/160, 161, 162

(56) References Cited

U.S. PATENT DOCUMENTS

| 5,220,669 | A | * | 6/1993 | Baum et al. ................. 395/775 |
| 5,870,546 | A | * | 2/1999 | Kirsch ......................... 709/203 |
| 5,897,666 | A | * | 4/1999 | Malick et al. ............... 711/217 |
| 5,907,680 | A | * | 5/1999 | Nielsen ....................... 709/238 |
| 5,978,848 | A | * | 11/1999 | Maddalozzo, Jr. et al. . 709/227 |
| 5,991,760 | A | * | 11/1999 | Gauvin et al. ................ 707/10 |
| 6,041,324 | A | * | 3/2000 | Earl et al. ....................... 707/9 |
| 6,092,100 | A | * | 7/2000 | Berstis et al. ............... 709/203 |

OTHER PUBLICATIONS

Davis et al., "Web Browsing with Netscape Navigator 1.1", 1995, Prima Communication Inc., p. 1–17 (17).*
Brown, "Using Netscape 2", 1995, Que, Special edition, p. 18–20 (3).*

* cited by examiner

*Primary Examiner*—Bunjob Jaroenchonwanit
(74) *Attorney, Agent, or Firm*—Owen J. Gamon; Matthew J. Bussan

(57) ABSTRACT

A mechanism for recovering from an invalid hyperlink address. In the preferred embodiment, a browser sends a request containing a hyperlink address of a file to a server. When the browser receives a message from the server indicating that the address is invalid, the browser shortens the address to the next highest directory deleting the most narrow portion of the address and retries the request using the new, shortened address. Since many servers have their files organized hierarchically, this recovery strategy provides a good alternative to the original, invalid address.

3 Claims, 20 Drawing Sheets

INVALID LINK RECOVERY

FIELD OF THE INVENTION

The present invention relates in general to improved information processing systems. In particular, the present invention relates to a method and system for recovering from invalid hyperlink addresses.

BACKGROUND

The development of distributed, computer networks, such as the Internet, allows users to retrieve vast amounts of electronic information previously unavailable. The Internet increasingly is displacing more conventional means of information transmission, such as newspapers, magazines, and even television.

Electronic information transferred between computer networks (e.g., the Internet) can be presented to a user in hypertext, a metaphor for presenting information in a manner in which text, images, sounds, and actions become linked together in a complex, nonsequential web of associations that permit the user to "browse" through related topics, regardless of the presented order of the topics. For example, traveling among links to the word "iron" in an article might lead the user to the periodic table of the chemical elements (i.e., linked by the word "iron"), or to a reference to the use of iron in weapons in Europe in the Dark Ages. The term "hypertext" is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked computers utilizing hypertext conventions typically follow a client/server architecture. A "client" is usually a computer that requests a service provided by another computer (i.e., a server). A "server" is typically a remote computer system accessible over the network. Based upon such requests by the user at the client, the server presents information to the user as responses to the client. The client typically contains a program, called a browser, that communicates the requests to the server and formats the responses for viewing (browsing) at the client. The browser retrieves a web page from the server and displays it to the user at the client.

A "web page" (also referred to as a "page") is a data file, or document, written in a hyper-text language that may have hyperlinks, text, graphic images, and even multimedia objects, such as! sound recordings or video clips, associated with that data file.

A hyperlink is an address or link that points to a web page. The hyperlink is often presented to the user as a button on a web page, which the user may select, which causes the browser to retrieve the linked web-page. This linked web-page might be on the same server as the first web-page, and it might have been created by the same web-page designer as the first web-page. But, it is very common for the two web pages to be on different servers and to have been created and maintained by different web-page designers. In fact, the creator of the linked web-page might be unaware that the first web-page contains the link.

Web pages can be quite dynamic, and it is common for their creators to change their content and even move them to different addresses or servers. Therefore, it is common for the user to encounter a broken or invalid hyperlink, meaning that when the user selects the hyperlink in a first web-page, the linked web-page is not present at the specified address. Although this is more common when the creators of the two web pages are different, it can also occur when the same creator created both web-pages and then has failed to keep them synchronized through oversight or neglect.

After moving a web page to a new address, some web page creators will temporarily place a pointer at the old address that points to the new address. Unfortunately, this is not a general purpose solution because not all web page creators will place a pointer at the old address, and even if they do, sometimes the pointer is also incorrect.

From the foregoing, it can be seen that a need exists for a mechanism for recovering from invalid hyperlink addresses.

SUMMARY OF THE INVENTION

The invention recovers from an invalid hyperlink address. In the preferred embodiment, a browser sends a request containing a hyperlink address of a file to a server. When the browser receives a message from the server indicating that the address is invalid, the browser shortens the address to the next highest directory by deleting the most narrow portion of the address and retries the request using the new, shortened address. Since many server haves their files organized hierarchically, this recovery strategy provides a good alternative to the original, invalid address.

DESCRIPTION OF THE PREFERRED EMBODIMENT

Technology Overview

Figure 1:
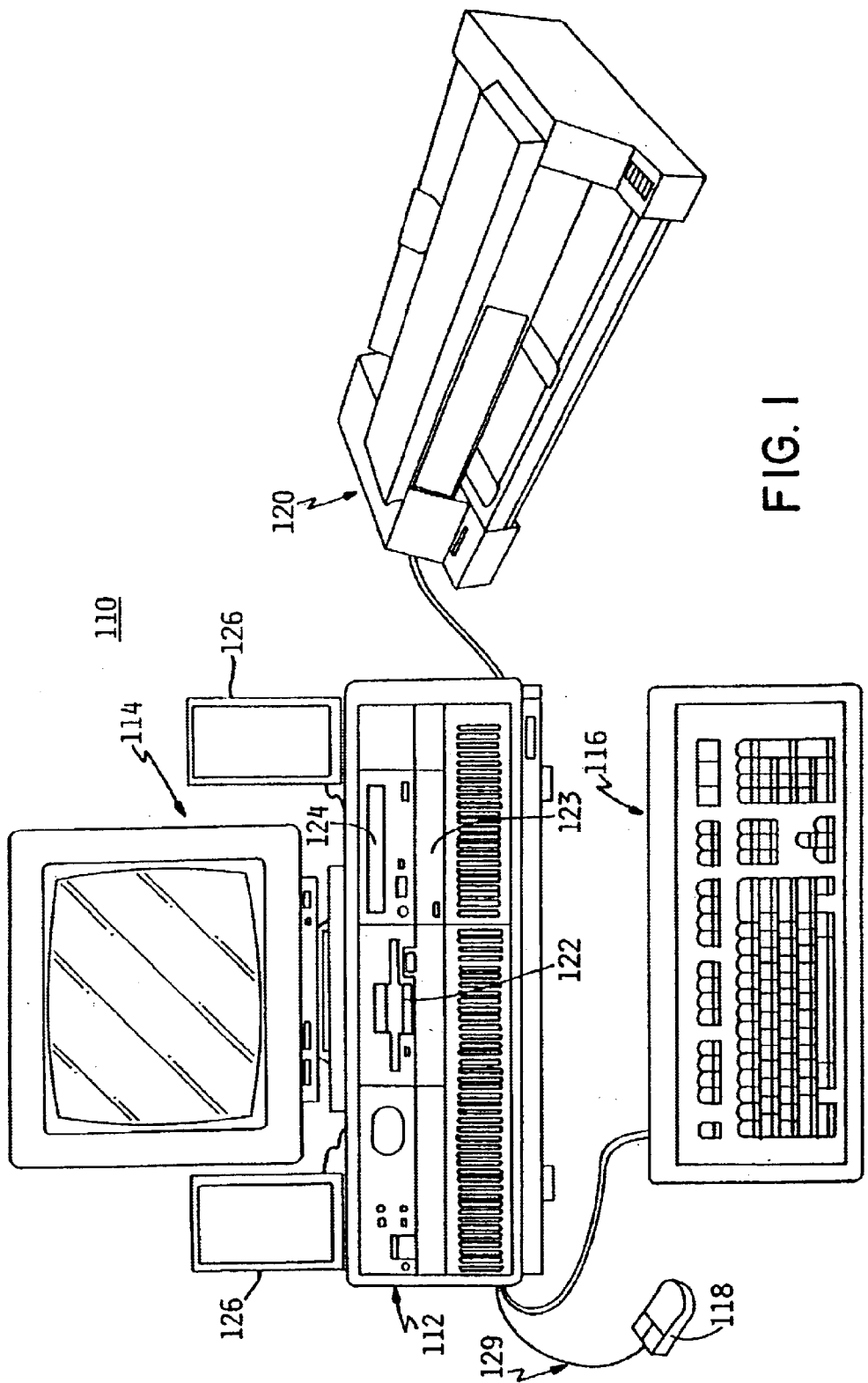
FIG. 1 is a pictorial representation of a computer system that may be utilized to implement a preferred embodiment.

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex nonsequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to know any working details about the other program or the service itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered electronic information to the user as server responses to the client process. The client process may be active in a first computer system, and the server process may be active in a second computer system; the processes communicate with one another over a communications medium that allows multiple clients to take advantage of the information-gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office). The URL specifies a hypertext transfer protocol ("http") and a name ("www.uspto.gov") of the server. The server name is associated with a unique numeric value (i.e., a TCP/IP address). The URL also specifies the name of the file that contains the text ("intro.html") and the hierarchical directory ("web") and subdirectory ("menu") structure in which the file resides on the server. A directory is a grouping of files on the server that usually contain related information. A subdirectory is a division within a directory. A URL might contain any number of directories and subdirectories. The delimiter that separates the various identifier components of the URL is a "/". The most narrow identifier in the hierarchical pathname is the filename, "intro.html". The most broad identifier in the pathname is the server name, "www.uspto.gov".

Active within the client is a first process, known as a "browser" that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays, or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, and video objects. A web page can be constructed by loading one or more separate files into an active directory or file structure that is then displayed as a viewable object within a graphical user interface.

A hyperlink within a web page is a link to another web page. The hyperlink is often presented to the user as a button, which the user may select, which causes the browser to retrieve the linked web-page. This linked web-page may be on the same server as the first web-page, and it might have been created by the same web-page designer as the first web-page. But, it is very common for the two web pages to be on different servers and to have been created and maintained by different web-page designers. In fact, the creator of a linked web-page might be unaware that the first web-page contains the link.

Web pages can be quite dynamic, and it is common for their creators to change their content and even move them to different addresses. Therefore, it is common for the user to encounter a broken hyperlink, meaning that when the user selects the hyperlink in a first web-page, the linked web-page is not present at the specified address. Although this is more common when the creators of the two web pages are different, it can also occur when the same creator created both web-pages and then has failed to keep them updated through oversight or neglect.

DETAILED DESCRIPTION

In the preferred embodiment, a browser sends a request containing a hyperlink address of a file to a server. When the browser receives a message from the server indicating that the address is invalid, the browser shortens the address to the next highest directory by deleting the most narrow portion of the address and retries the request using the new, shortened address. Since many server haves their files organized hierarchically, this recovery strategy provides a good alternative to the original, invalid address.

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 114.

Video-display terminal 114 is the visual output of computer system 110. As indicated herein, video-display terminal 114 can be a cathode-ray tube (CRT) based video display well-known in the art of computer hardware. But, with a portable or notebook-base computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112.

Computer system 110 can be implemented utilizing any suitable computer such as the AS/400 computer system or IBM Aptiva computer, both products of International Business Machines Corporation, located in Armonk, N.Y. But, a preferred embodiment of the present invention can apply to any hardware configuration that allows browsing of documents, regardless of whether the computer system is a complicated, multi-user computing apparatus, a single-user workstation, or a network appliance that does not have non-volatile storage of its own.

Figure 2:
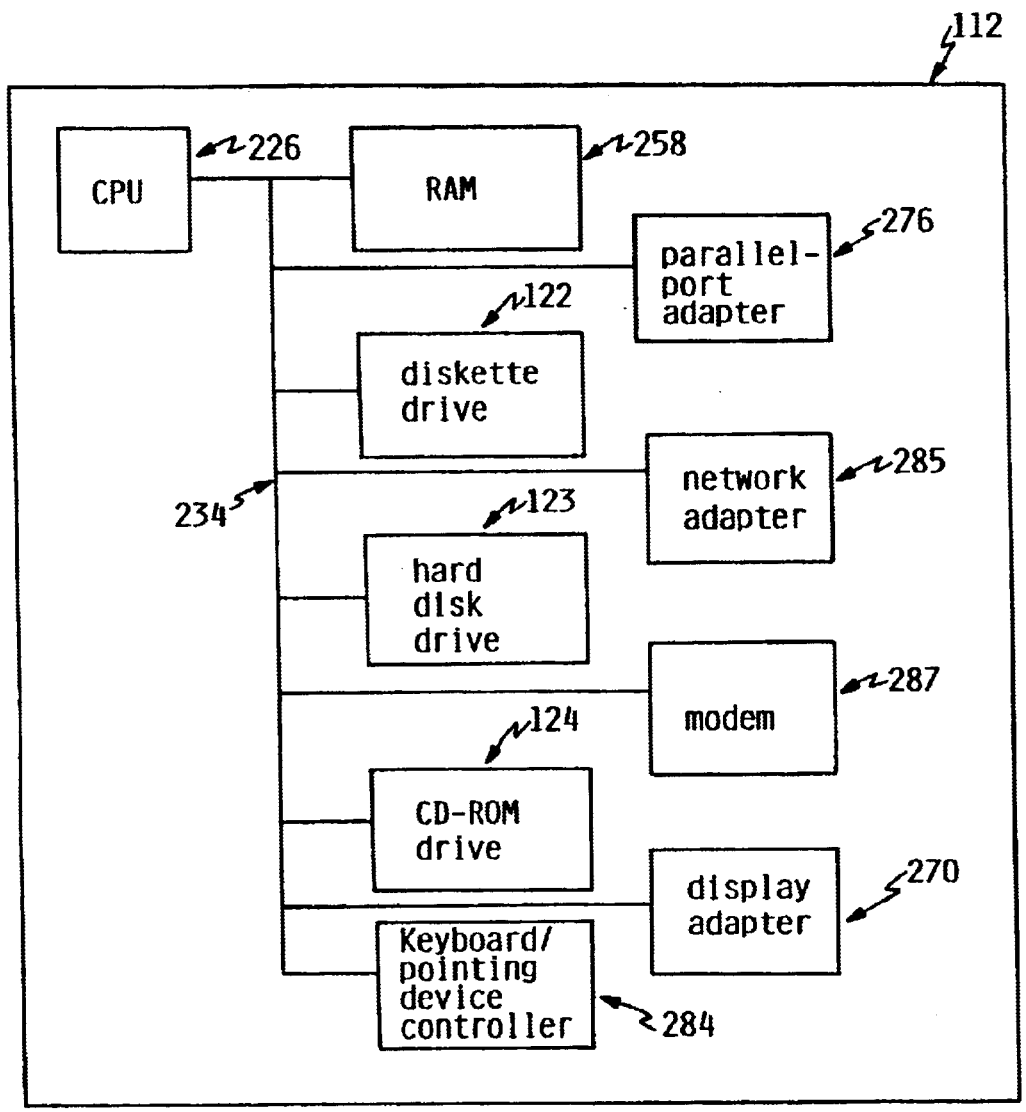
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

While any appropriate processor can be utilized for CPU 226, it is preferably one of the Power PC line of microprocessors available from IBM. Alternatively, CPU 226 can be implemented as one of the 80×86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual volatile memory modules that store segments of operating system and application software while power is supplied to computer system 110. The software segments are partitioned into one or more virtual memory pages that each contain a uniform number of virtual memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without having to start from the beginning.

Hard disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or microfloppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
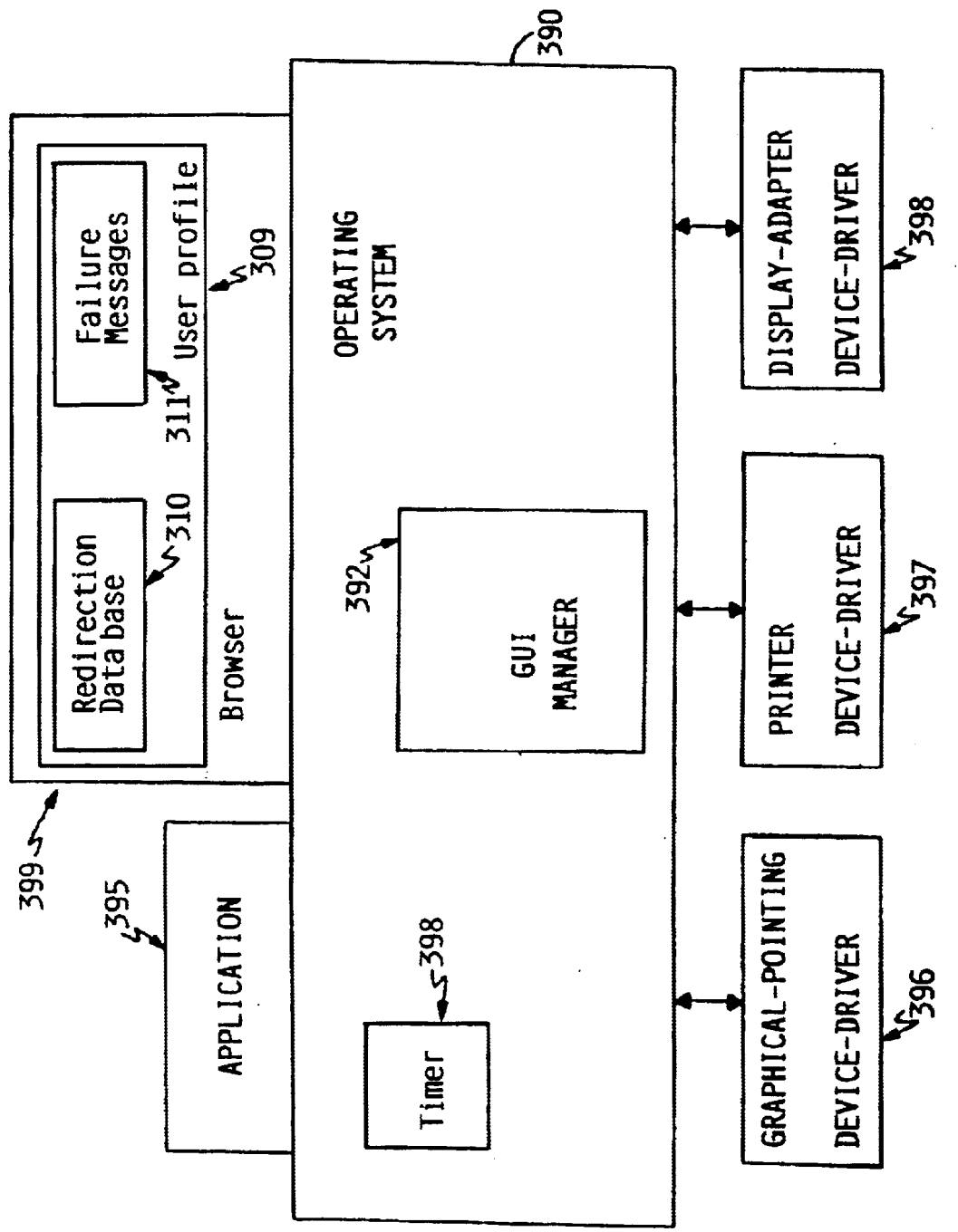
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2 operating systems) could be used. Other technologies also could be utilized, such as touch-screen technology or human-voice control. The operating system is the foundation upon which applications 395, such word-processing, spreadsheet, and web-browser programs are built.

In accordance with the preferred embodiment, operating system 390 includes graphical-user-interface (GUI) 392 manager although they could be packaged separately. GUI 392 manages the graphical-user-interface with which a user of computer system 110 interacts.

Operating system 390 also contains timer 398, which is a software object that uses the system clock of CPU 226 to measure time and is capable of interrupting software instructions executing on CPU 226 after a specified time. In an alternative embodiment, timer 398 could be a hardware register, such as a clock register or a time register. Setting the timer would then place a value in the register, and the register would decrement the value with each instruction or cycle. An interrupt would occur when the register value reaches zero, which interrupts software instructions executing on CPU 226 after the specified time.

Operating system 390 communicates with applications 395 and browser 399 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

CPU 226 is suitably programmed to carry out the preferred embodiment by browser 399, as described in more detail in the flowcharts of FIGS. 11–18. In the alterative, the functions of FIGS. 11–18 could be implemented by control circuitry through the use of logic gates, programmable-logic devices, or other hardware components in lieu of a processor-based system.

Browser 399 contains user profile 309, which contains redirection database 310 and failure messages 311, which are further described under the description for FIGS. 8 and 9, below. In an alternative embodiment, user profile 309 could be packaged separately from browser 399. Although browser 399 is drawn as being separate from operating system 390, they could be packaged together. Although redirection database 310 is drawn as being contained within browser 399, in an alternative embodiment, redirection database 310 could be contained on server 488, shown in FIG. 6.

Figure 4:
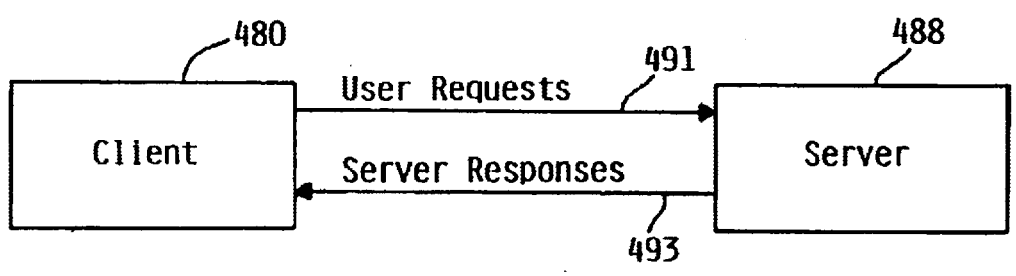
FIG. 4 is: a block diagram illustrative of a client/server architecture in accordance with a preferred embodiment.

FIG. 4 is a block diagram illustrative of a client/server architecture, in accordance with a preferred embodiment. User requests 491 are sent by client process 480 to server 488. Server 488 can be a remote computer system accessible over a computerized, distributed-information resource such as the Internet or other communications network. Server 488 performs scanning and searching of information sources and, based upon these user requests, presents the filtered electronic information as server responses 493 to the client process. The client process may be active in a first computer system (such as computer system 110), and the server process may be active in a second computer system, communicating with one another over a communications medium, thus providing distributed functionality and allowing multiple clients to take advantage of the information-gathering capabilities of the server.

Figure 5:
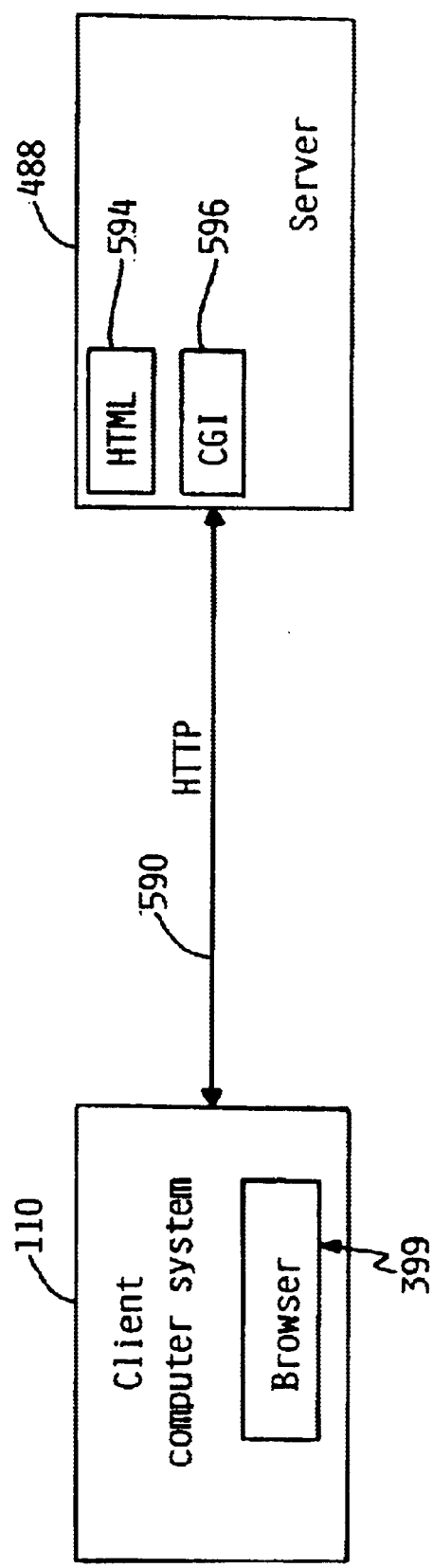
FIG. 5 is a detailed block diagram of a client/server architecture in accordance with a preferred embodiment.

FIG. 5 illustrates a detailed block-diagram of a client/server architecture in accordance with a preferred embodiment. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within client 110 is a first client process, browser 399, which establishes connections with server 488 and presents information to the user.

Server 488 executes the corresponding server software, which presents information to the client in the form of HTTP responses 590. The HTTP responses 590 correspond with the web pages represented using HTML or other data generated by server 488. Server 488 provides HTML 594. Server 488 also provides Common Gateway Interface (CGI) 596, which allows client 110 to direct server 488 to commence execution of a specified program contained within server 488. This may include a search engine that scans received information in the server for presentation to the user controlling the client. Using this interface and HTTP responses 590, server 488 may notify client 110 of the results of that execution upon completion. Although the protocols of HTML, CGI, and HTTP are shown, any suitable protocols could be used.

Figure 6:
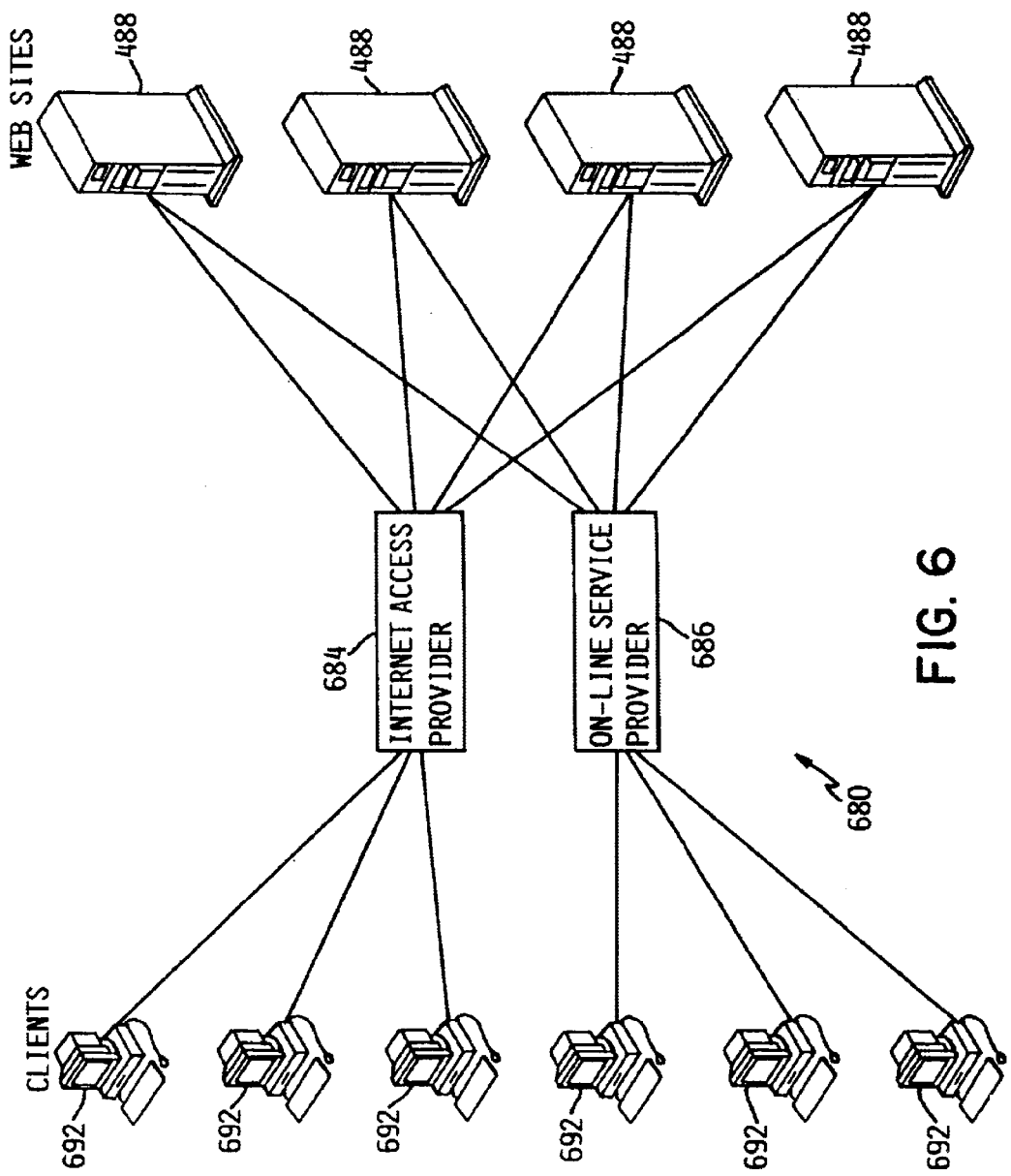
FIG. 6 is a diagram illustrative of a computer network that can be implemented in accordance with a preferred embodiment.

FIG. 6 is a diagram illustrative of a computer network 680, which can be implemented in accordance with a preferred embodiment of the present invention. Computer network 680 is representative of the Internet, which can be described as a known computer network based on the client-server model discussed herein. Conceptually, the Internet includes a large network of servers 488 that are accessible by clients 692, typically computers such as computer system 110, through some private Internet access provider 684 (e.g., Internet America) or an on-line service provider 686 (e.g., America On-Line, Prodigy, and Compuserve). Each of clients 692 may run browser 399 to access servers 488 via the access providers. Each server 488 operates a so-called "web site" that supports files in the form of documents or pages. A network path to servers 488 is identified by a Universal Resource Locator (URL) having a known syntax for defining a network connection.

Figure 7:
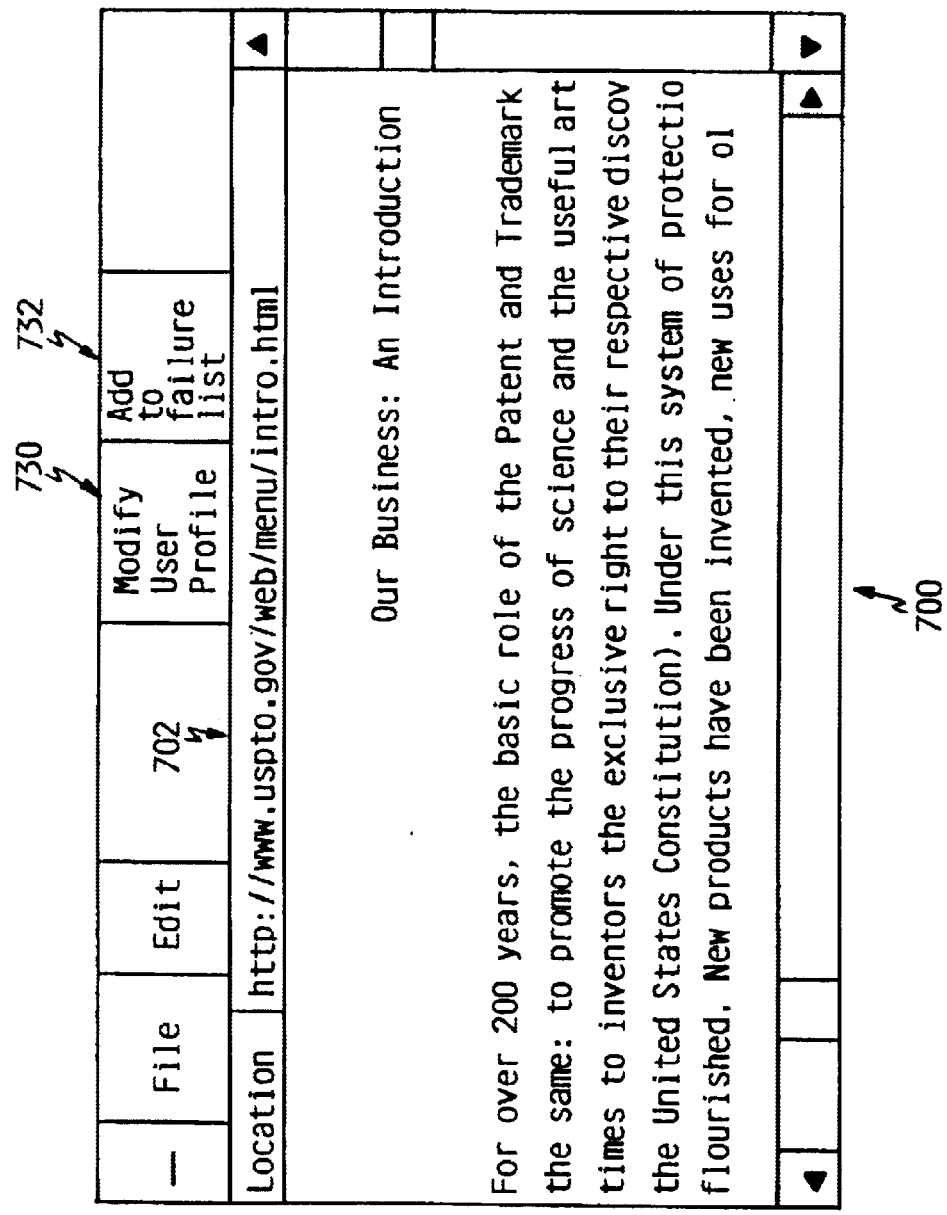
FIGS. 7, 8, 9, and 10 are pictorial representations of the interfaces that a user may operate to control the operation of a preferred embodiment.

FIG. 7 illustrates a pictorial representation of the interfaces that are used to control the operations of the preferred embodiment. FIG. 7 contains browser window 700, which is displayed on display screen 114. The user has previously entered URL 702, which is the address from which browser 399 downloaded the example page from a server.

Modify user-profile 730 allows the user to control the configuration of the link-recovery function. When the user selects menu option 730, browser 399 displays a dialog, as shown in the example of FIGS. 8 and 9 described below. When the user selects add-to-failure-list button 732, this directs browser 399 to add the received failure message to failure messages 311. The received failure message might indicate that the requested URL is not found, that the retrieved page is empty or has errors, or that the link is otherwise broken.

Figure 8:
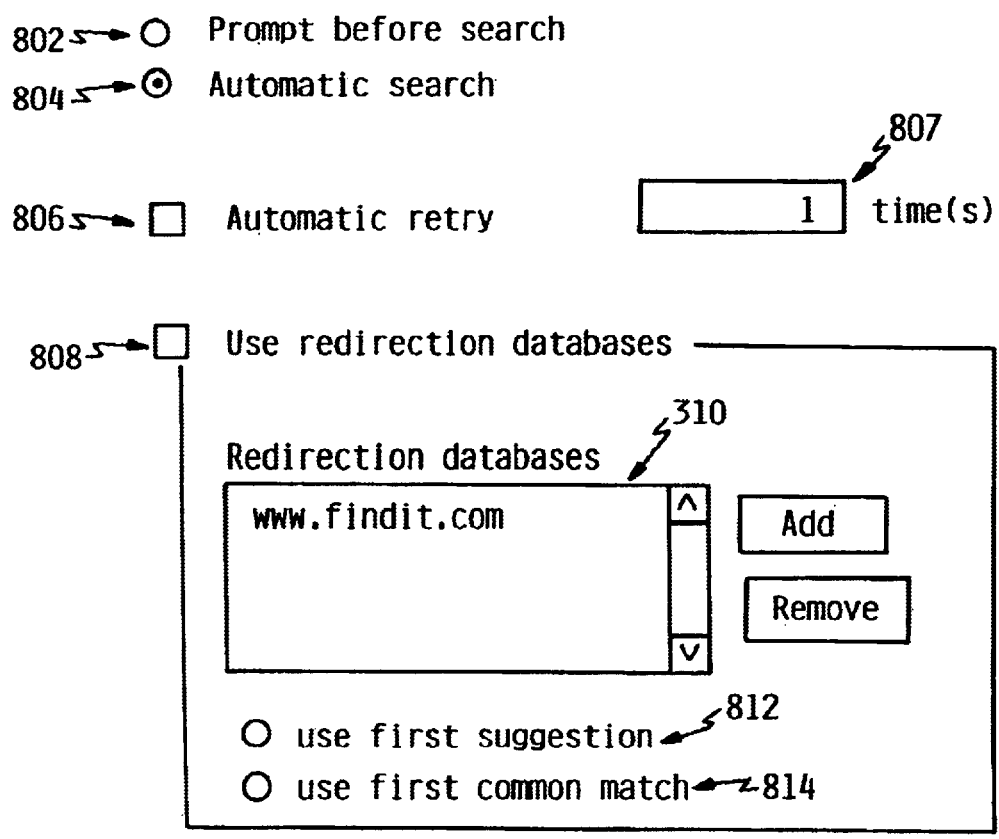
Figure 9:
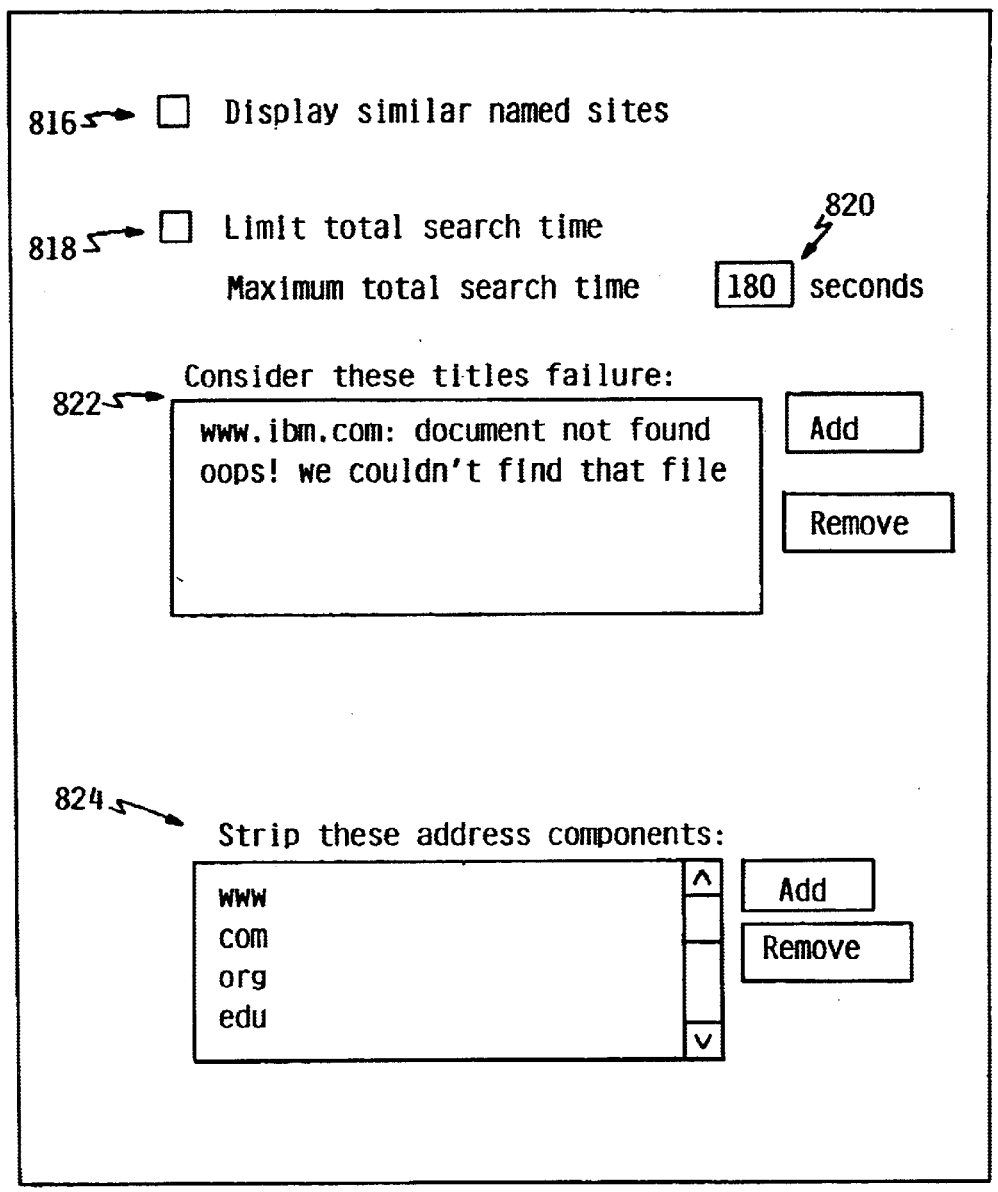

FIGS. 8 and 9 illustrate a pictorial representation of the interfaces presented by browser 399 when the user selects modify user-profile 730, as described above under the description for FIG. 7. Referring again to FIGS. 8 and 9, browser 399 has displayed the fields in user profile 309 that are available for the user to modify. These fields include prompt before-search 802, automatic search 804, automatic retry 806, number of retries 807, use redirection-databases 808, redirection databases 310, use first-suggestion 812, use first-common-match 814, display similar named-sites 816, limit total search-time 818, maximum total-search-time 820, failure messages 822, and address components 824.

Prompt before-search 802 gives the user the opportunity to specify that browser 399 should ask user for permission before searching to recover from a broken link. Automatic search 804 gives the user an opportunity to specify that browser 399 should automatically search for a new, alternative link following the discovery of a broken link. Prompt before-search 802 and automatic search 804 are mutually exclusive options. Automatic retry 806 gives the user the opportunity to specify that browser 399 should repeat the request for the same link when a broken link is found. Number of retries 807 contains the user-specified count value for number of times to retry. Use redirection database 808 gives the user the opportunity to direct browser 399 to use the search engines specified in redirection databases 310 in an attempt to find an alternative link to the broken link. In the example of FIG. 8, redirection databases 310 contains the fictitious search engine "www.findit.com". But, redirection databases 310 could contain any Internet search engine, such as Webcrawler, Lycos, or Infoseek. Use redirection databases 808 provides 10 the user with an interface to add and remove the contents of redirection databases 310.

Display similar-named sites 816 gives the user the opportunity to specify that browser 399 should search for web sites that have a similar name to the broken link. Sites will have similar names when the names are identical except for any components that listed in address component 824 or when they have similar sounding names, as further described below under the description for FIG. 14. Referring again to FIG. 9, limit total-search-time 818 gives the user the opportunity to specify that the amount of time that browser 399 searches should be limited to the number of seconds specified in maximum total-search-time 820. Failure messages 822 provides the user with an interface to add and remove the contents of failure messages 311. Failure messages 822 gives the user the opportunity to specify the messages that browser 399 should check for when determining whether a link is broken. Address components 824 gives the user the opportunity to specify that browser 399 should ignore the contents of address components 824 when searching for alternative links, as further described below under the description for FIG. 14. Referring again to FIG. 9, the example contents of address components 824 are "WWW", "com", "org", and "edu".

Figure 10:
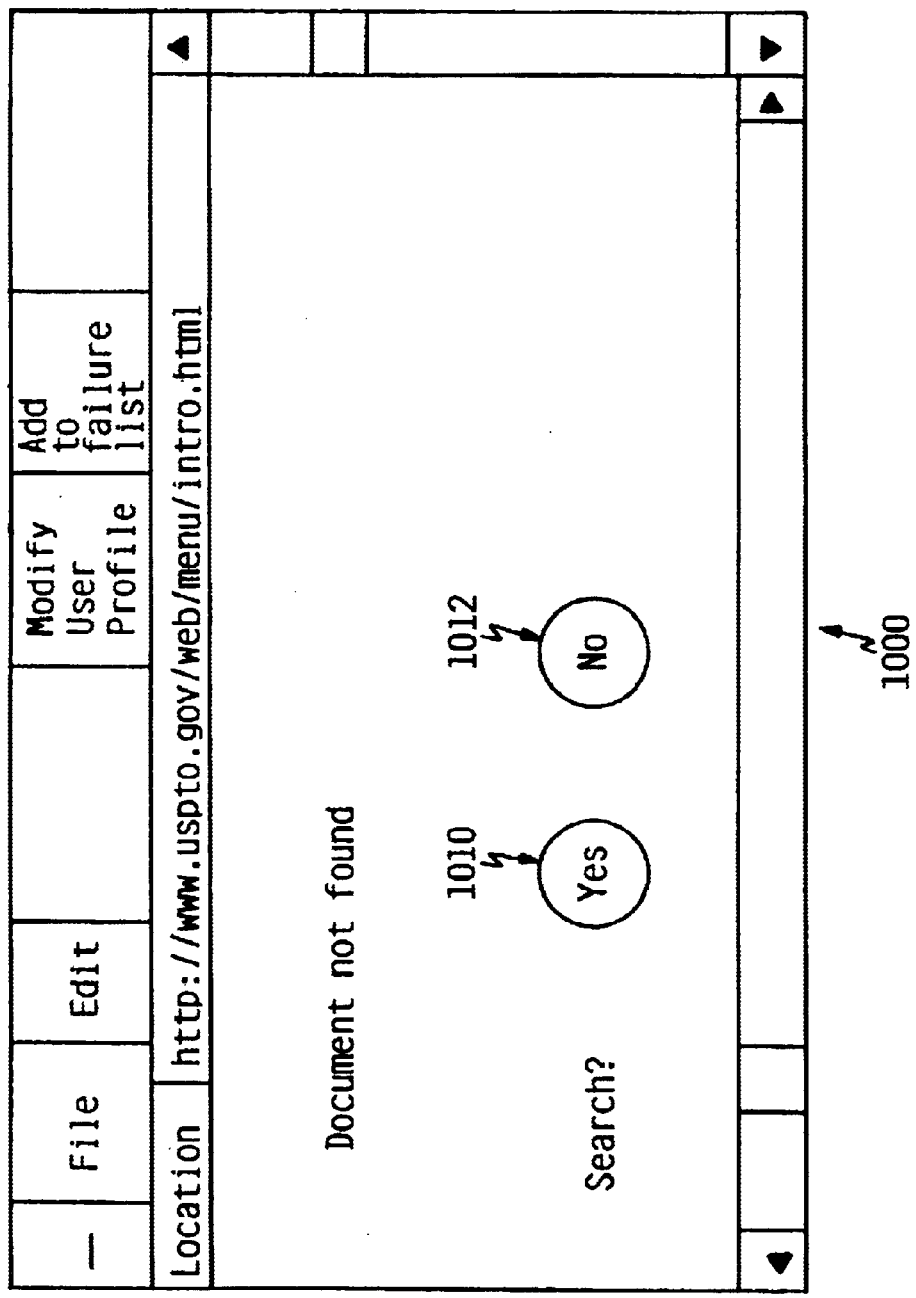

FIG. 10 is a pictorial representation of the interface that is used to control the operation of the preferred embodiment when the user has selected prompt before-search 802 and a broken link is found. Browser window 1000 is shown, which is displayed on display screen 114. The user is given the opportunity to either request a search, via button 1010, or decline a search, via button 1012.

Figure 11A:
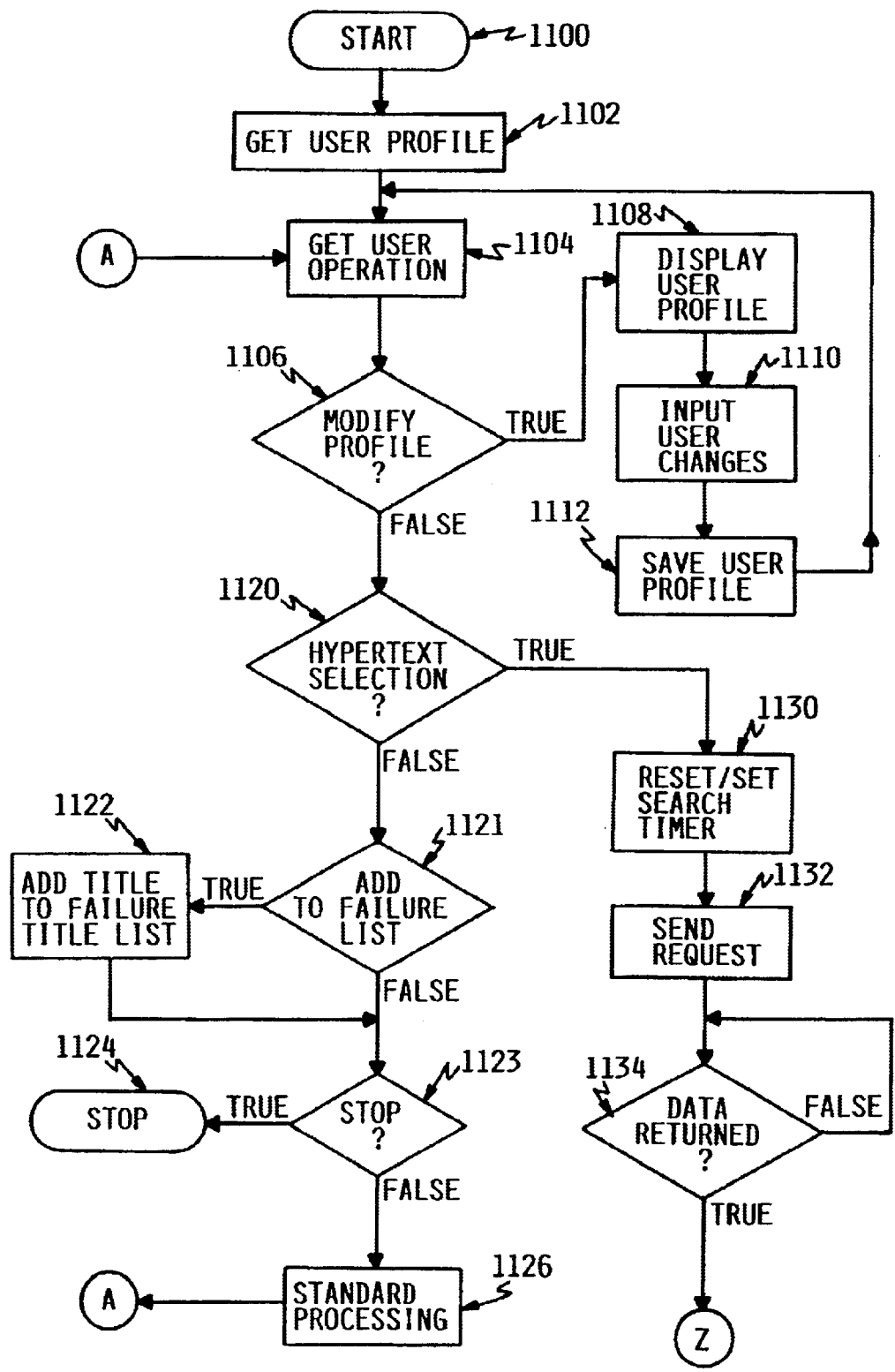
FIGS. 11, 12, 13, 14, 15, 16, 17, and 18 are flowcharts that describe the operation of the preferred embodiment.
Figure 11B:
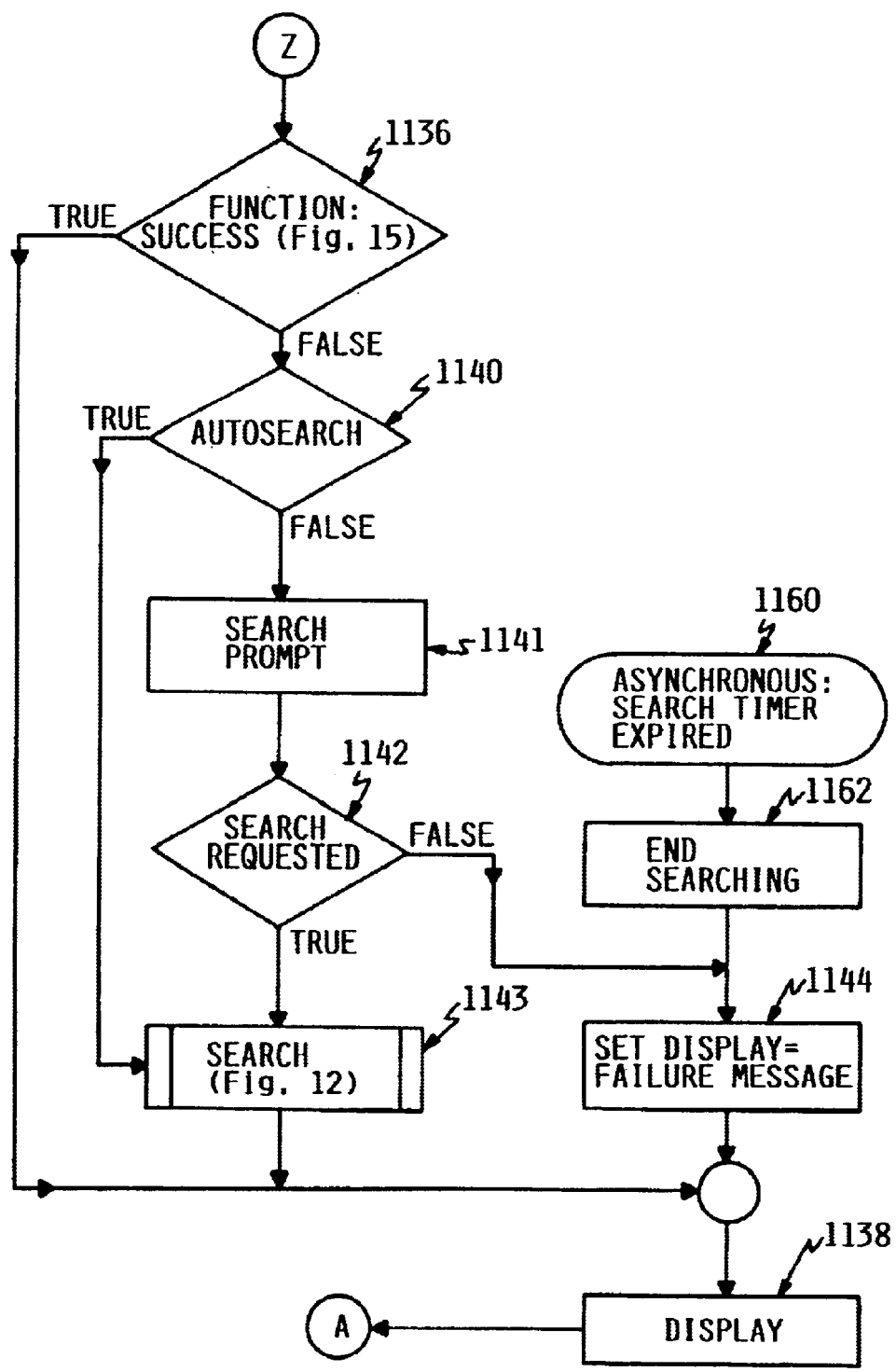

FIGS. 11–18 illustrate flowcharts that describe the operation of the preferred embodiment. Referring to FIG. 11, there is illustrated the main logic of browser 399 that responds to requests from the user. At block 1100, browser 399 starts. Control then continues to block 1102 where browser 399 retrieves user profile 309. Control then continues to block 1104 where browser 399 retrieves the next operation requested by the user. For example, the user might have requested to modify user profile 309, might have requested browser 399 to load a web page at a user-specified URL, or might have requested any other standard operation provided by a web browser.

Control then continues to block 1106 where browser 399 determines whether the user has requested modify-profile operation 730. If the determination at block 1106 is true, then control continues to block 1108 where browser 399 displays the contents of user profile 309 to the user, as previously described above in the examples of FIG. 8 and FIG. 9. Referring again to FIG. 11, control then continues to block 1110 where browser 399 gives the user an opportunity to make changes to user profile 309. Control then continues to block 1112 where browser 399 saves the user-supplied changes to user profile 309. Control then returns to block 1104 for processing of the next user operation.

If the determination at block 1106 is false, then control continues to block 1120 where browser 399 determines whether the user has requested a hypertext-selection operation. The user might request such an operation by clicking on a link in a web page, by typing in a URL, or by selecting a URL from a bookmark or favorites list.

If the determination at block 1120 is false, then control continues to block 1121 where browser 399 determines whether the user selected add-to-failure-list button 732 in response to a failure message. If the determination at block 1121 is true, the control continues to block 1122 where browser 399 adds the failure message received to failure message list 311. Control then continues to block 1123, as further described below.

If the determination at block 1121 is false, then control continues to block 1123 where browser 399 determines whether the user has requested a stop operation. If the determination at block 1123 is true, then browser 399 stops at block 1124.

If the determination at block 1123 is false, control then continues to block 1126 where the processing for all other user-requested operations is executed. Control then returns to block 1104 for processing of the next user-selected operation, as previously described above.

If the determination at block 1120 is true, then control continues to block 1130 where browser 399 resets timer 398 and then sets it to the value entered by the user at reference numeral 820 in FIG. 9. Referring again to FIG. 11, control then continues to block 1132 where browser 399 sends the hypertext request for a web page, selected by the user in block 1104, to the server specified by the requested URL. Control then continues to block 1134 where browser 399 determines whether the data requested in block 1132 has been returned from the server. Browser 399 continually loops and checks at block 1134 until the data is returned, at which time control continues to block 1136 where browser 399 determines whether the data returned indicates that the web page was found, as further described below under the description for FIG. 15. Referring again to FIG. 11, if the determination at block 1136 is true, then control continues to block 1138 where browser 399 displays the returned data and then returns to block 1104, as previously described above.

If the determination at block 1136 is false, then browser 399 continues to block 1140 where browser 399 determines whether the user has requested that an automatic search be done. The user can request this via automatic search 804, which is stored in user profile 309. If the determination at block 1140 is true, then control continues to block 1143 where browser 399 searches for an alternative web page as further described below under the description for FIG. 12. Referring again to FIG. 11, control then continues to block 1138 where browser 399 displays the alternative web page found at block 1143. Control then returns to block 1104 as previously described above.

If the determination at block 1140 is false, then control continues to block 1141. If the user has not selected auto search 804, then the user must have selected prompt before search 802. At block 1141, browser 399 queries the user whether a search should be done as shown in FIG. 10. Control then continues to block 1142 where browser 399 determines whether the user wishes to initiate a search. If the determination at block 1142 is true (the user selected button 1010), then control continues to block 1143, as previously described above. If the determination at block 1142 is false (the user selected button 1012), then control continues to block 1144 where browser 399 sets the data to be displayed to be the failure message retrieved at block 1136. Control then continues to block 1138 where browser 399 displays the failure message. Control then returns to block 1104, as previously described above.

When the search timer that was set at block 1130 expires, an interrupt occurs that causes the processing indicated at block 1160 to be entered. Control then continues to block 1162 where browser 399 concludes any searching that is currently being done. Referring again to FIG. 11, control then continues to block 1144 where browser 399 sets the data to be displayed to be a failure message. Control then continues to block 1138 where browser 399 displays the failure message. Control then returns to block 1104 as previously described above.

Figure 12:
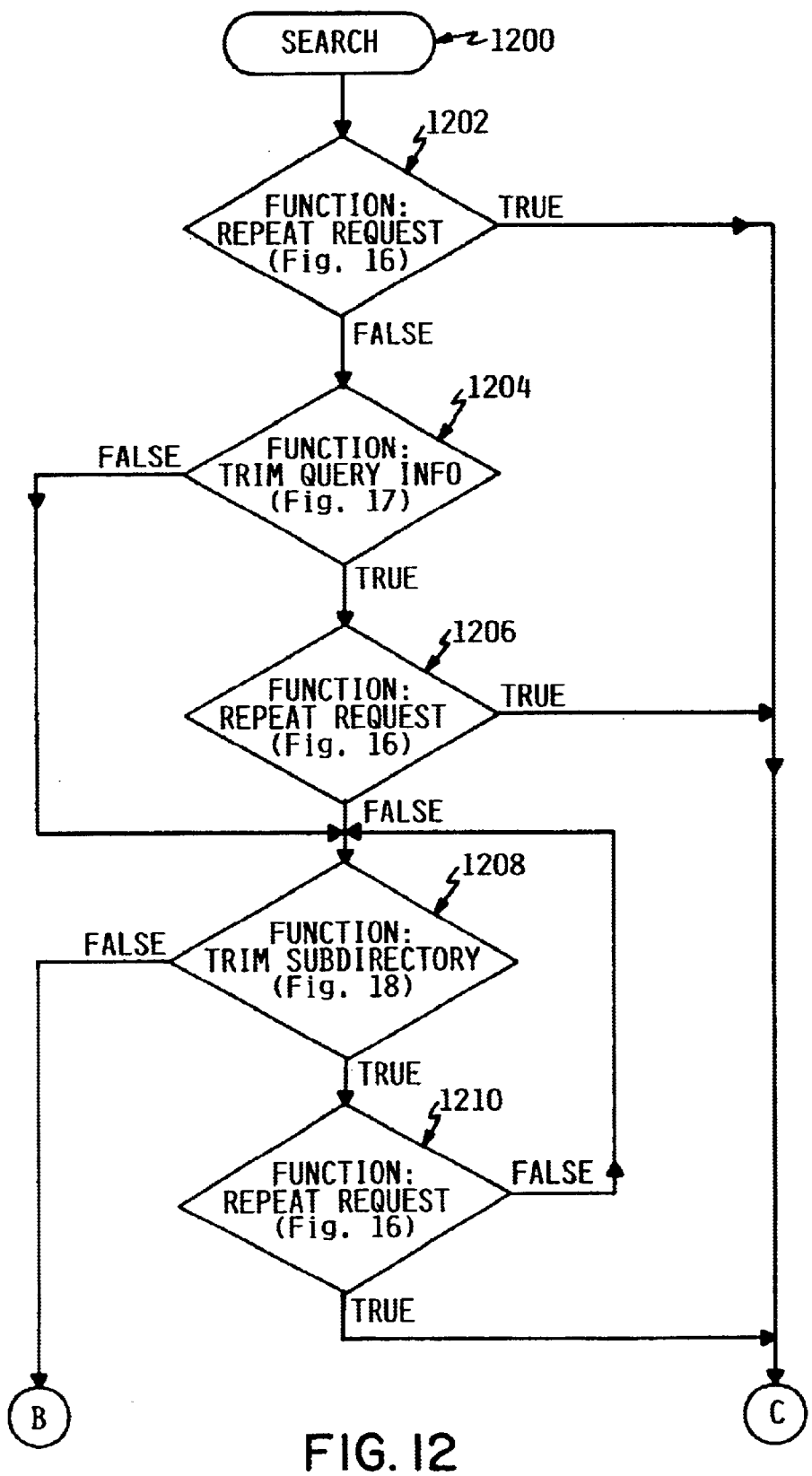
Figure 13:
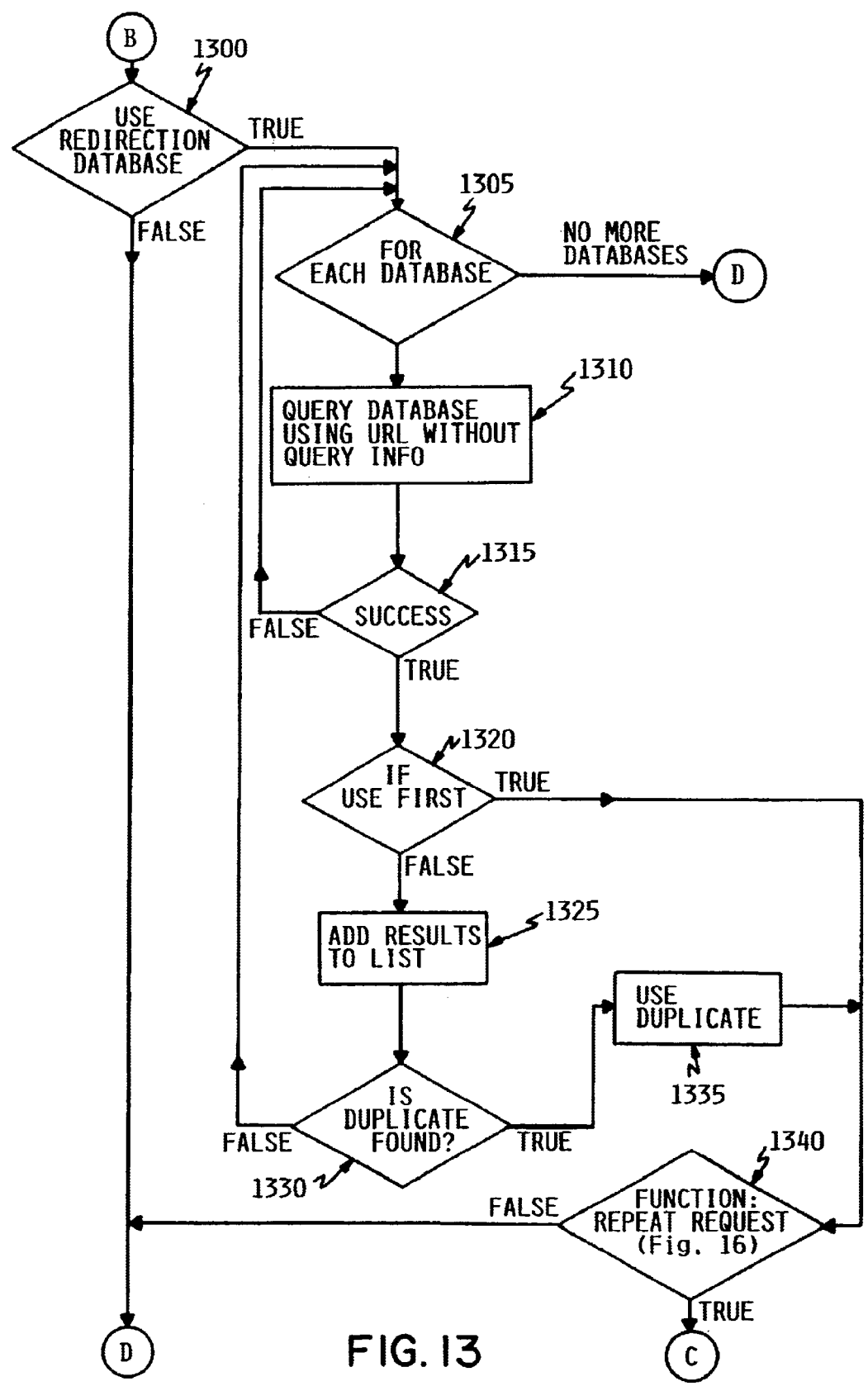
Figure 14A:
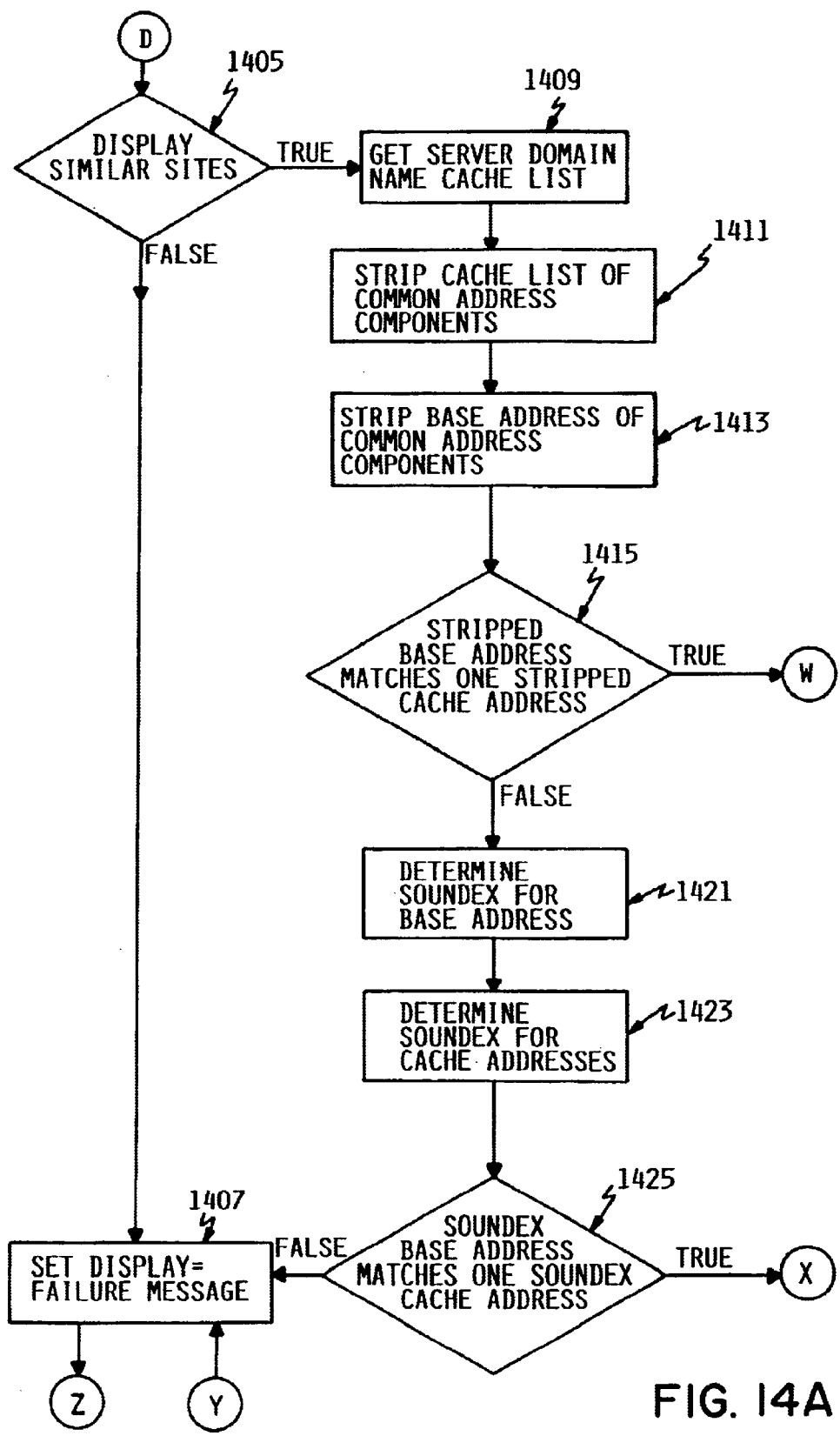
Figure 14B:
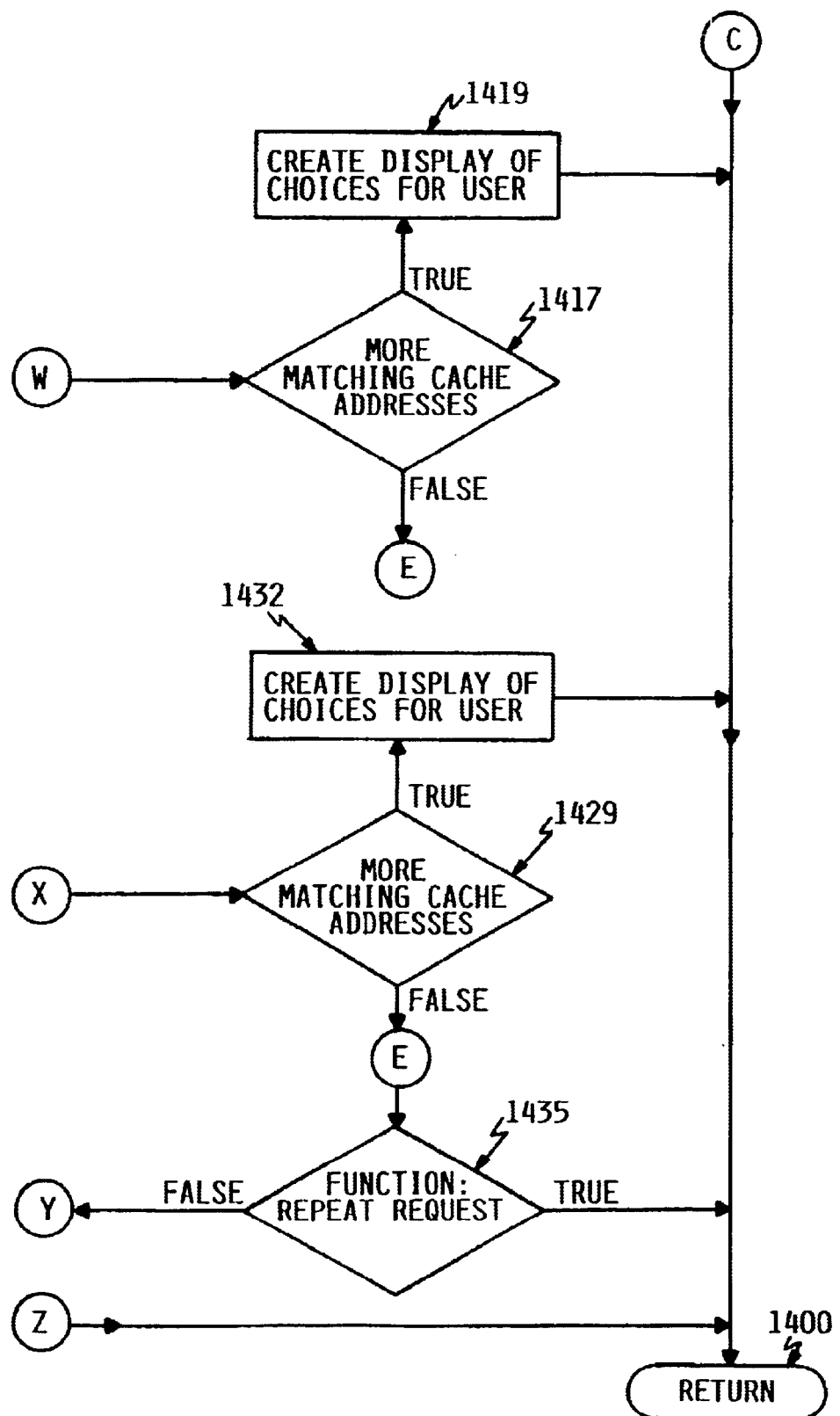

Referring to FIGS. 12, 13, and 14, there is illustrated sample logic for browser 399 that searches for an alternative link to the broken link. Control begins at block 1200. Control then continues to block 1202 where browser 399 determines whether the repeat-request function returned a value of true or false. The repeat-request function, as further described below under the description for FIG. 16, repeatedly retries a send-request operation to the server. The repeat-request function returns a value of true when browser 399 successfully retrieves data from the server and a value of false when browser 399 does not successfully retrieve data from the server. Referring again to FIGS. 12, 13, and 14, if the determination at block 1202 is true, then merely retrying the original URL was successful, so control continues to block 1400 where the function returns.

If the determination at block 1202 is false, then control continues to block 1204 where browser 399 determines whether the trim query-info function returned a value of true or false. The trim query-info function, as further described below under the description for FIG. 17, trims the requested URL from the last delimiter position to the end and returns a value of true when such a delimiter exists. For example, some URLs have a question-mark delimiter and query information following the question mark, that is, to the right of the question mark. A server will use this query information to find data associated with the query within a file, and the logic of FIG. 17 will delete this query information. The function returns a value of false when such a delimiter does not exist. Referring again to FIGS. 12, 13, and 14, if the determination at block 1204 is true, then control continues to block 1206 where browser 399 determines whether the repeat-request function returned a value of true or false. If the determination at block 1206 is true, then control continues to block 1400 where the function returns. By trimming the query information in block 1204 and repeating the request with the trimmed URL in block 1206, browser 399 is shortening the link to return the file in which the query information was directed.

If the determination at block 1206 is false, or if the determination at block 1204 is false, then control continues to block 1208 where browser 399 determines whether the trim-subdirectory function returned a value of true or false. The trim-subdirectory function, as further described below under the description for FIG. 18, trims the URL from the last delimiter-position to the end and returns a value of true when such a last delimiter-position exists, and returns a value of false when such a last delimiter-position does not exist. If the determination at block 1208 is true, then control continues to block 1210 where browser 399 determines whether the repeat-request function returned a value of true or false. If the determination at block 1210 is false, then control returns to block 1208, as previously described above. Thus, the combined action of blocks 1208 and 1210 repeatedly shortens the URL to the next highest directory within the URL until no directories remain and the base site address is attempted. Since many servers are organized hierarchically, this strategy should obtain a good alternative link for the user in many situations. If the determination at block 1210 is true, then control continues to block 1400 where the function returns.

If the determination at block 1208 is false, then trimming the query information and repeatedly trimming subdirectories from the URL until the base site address was reached did not result in a successful link, so control continues to block 1300 where browser 399 determines whether the user requested that redirection databases 310 be used at reference number 808 in FIG. 8. Referring again to FIGS. 12, 13, and 14, if the determination at block 1300 is true, then control continues to a loop represented by blocks 1305, 1310, and 1315. For every search engine in redirection databases 310, at block 1310 browser 399 searches for the base URL remaining after the original URL was trimmed in block 1208 using the search engine and determines at block 1315 whether one or more URLs were returned from the query done at block 1310. In block 1310, browser 399 is using the base URL as a search term that is input to the search engine. Thus, the search engine is using the URL as text to be searched for, not as an address to locate. In an alternative embodiment, browser 399 removes the contents of address components 824 from the base URL prior to submitting it as a search term to the search engine.

When a match is found at block 1315, then control continues to block 1320 where browser 399 determines whether the user has previously selected use-first suggestion 812. If the determination at block 1320 is false, then control continues to block 1325 where browser 399 adds the results of the most recent query-database operation done in block 1310 to a list of redirection URLs. Control then continues to block 1330 where browser 399 determines whether the list of redirection URLs contain duplicate entries and whether the user selected first common match 814. If the determination at block 1330 is false, then control returns to block 1305, as previously described above. If the determination at block 1330 is true, then control continues to block 1335 where browser 399 uses the duplicate as the best choice. Control then continues to block 1340 where browser 399 determines whether the repeat-request function returned a value of true or false. The repeat-request function is further described below under the description for FIG. 16. If the determination at block 1340 is true, then control continues to block 1400 where the function returns.

If the determination at block 1340 is false or if the determination at block 1300 is false, or if the determination at block 1305 is no more databases, then control continues to block 1405 where browser 399 determines whether the user previously selected display similar-name-sites 816.

If the determination at block 1405 is false, then control continues to block 1407 where browser 399 sets the message to be displayed to be a failure message and then returns to block 1400.

If the determination at block 1405 is true, then control continues to block 1409 where browser 399 retrieves the server domain-name cache-list from the server. The server domain-name-cache-list contains the server names and IP addresses of all the servers that this server has recently accessed. Control then continues to block 1411 where browser 399 strips common address components 824 from all entries in the cache list previously retrieved in block 1409. Control then continues to block 1413 where browser 399 strips common address components 824 from the base address of the user-selected hyperlink, which is the address left following the last trim previously performed at block 1208. Control then continues to block 1415 where browser 399 determines whether the stripped base-address matches one of the stripped cache-addresses.

If the determination at block 1415 is true, then control continues to block 1417 where browser 399 determines whether the stripped base-address matches more of the stripped cache-addresses. If the determination at block 1417 is false, then control continues to block 1435 where the repeat request function is invoked, which submits a request for the URL in the cache list that was matched at block 1415. The repeat request function is further described below under the description of FIG. 16. Referring again to FIG. 14, if the determination at block 1435 is true, then the function returns at block 1400. If the determination at block 1435 is false, then control continues to block 1407, as previously described above.

If the determination at block 1417 is true, then control continues to block 1419 where browser 399 creates a display of choices for the user, from which the user may choose. The display of choices includes a list of URLs found, so that the user may pick an alternative link to the broken link. Control then continues to block 1400 where the function returns.

If the determination at block 1415 is false, then control continues to block 1421 where browser 399 determines the soundex for the stripped base-address. Soundex is an algorithm that hashes English strings into alpha-numeric values, such that strings that sound the same, or similar, are transformed into the same value. Thus, soundex allows for non-literal string matching based on words that are spelled differently but sound the same, or similar, when pronounced. The soundex algorithm is described at page 391–392, The Art of Computer Programming, Volume 3, Sorting and Searching, by Donald Knuth. Although soundex is used in the preferred embodiment, any algorithm that matches sounds of words could be used. Control then continues to block 1423 where browser 399 determines the soundex for all the stripped cache-addresses which were stripped in block 1411 above. Control then continues to block 1425 where browser 399 determines whether the soundex base address matches one of the soundex cache-addresses.

If the determination at block 1425 is false, then control continues to block 1407 where browser 399 sets the message to be displayed to be a failure message and returns at block 1400.

If the determination at block 1425 is true, then control continues to block 1429 where browser 399 determines whether there are any more soundex cache addresses that match the soundex base address.

If the determination at block 1429 is false, then control continues to block 1435 where the repeat request function is invoked, which submits a request for the URL in the cache list that was matched at block 1425. The repeat request function is further described below under the description of FIG. 16. Referring again to FIG. 14, if the determination at block 1435 is true, then the function returns at block 1400. If the determination at block 1435 is false, then control continues to block 1407, as previously described above.

If the determination at block 1429 is true, then control continues to block 1432 where browser 399 creates a display of the matched URLs from which the user may choose. Control then continues to block 1400 where the function returns.

Figure 15:
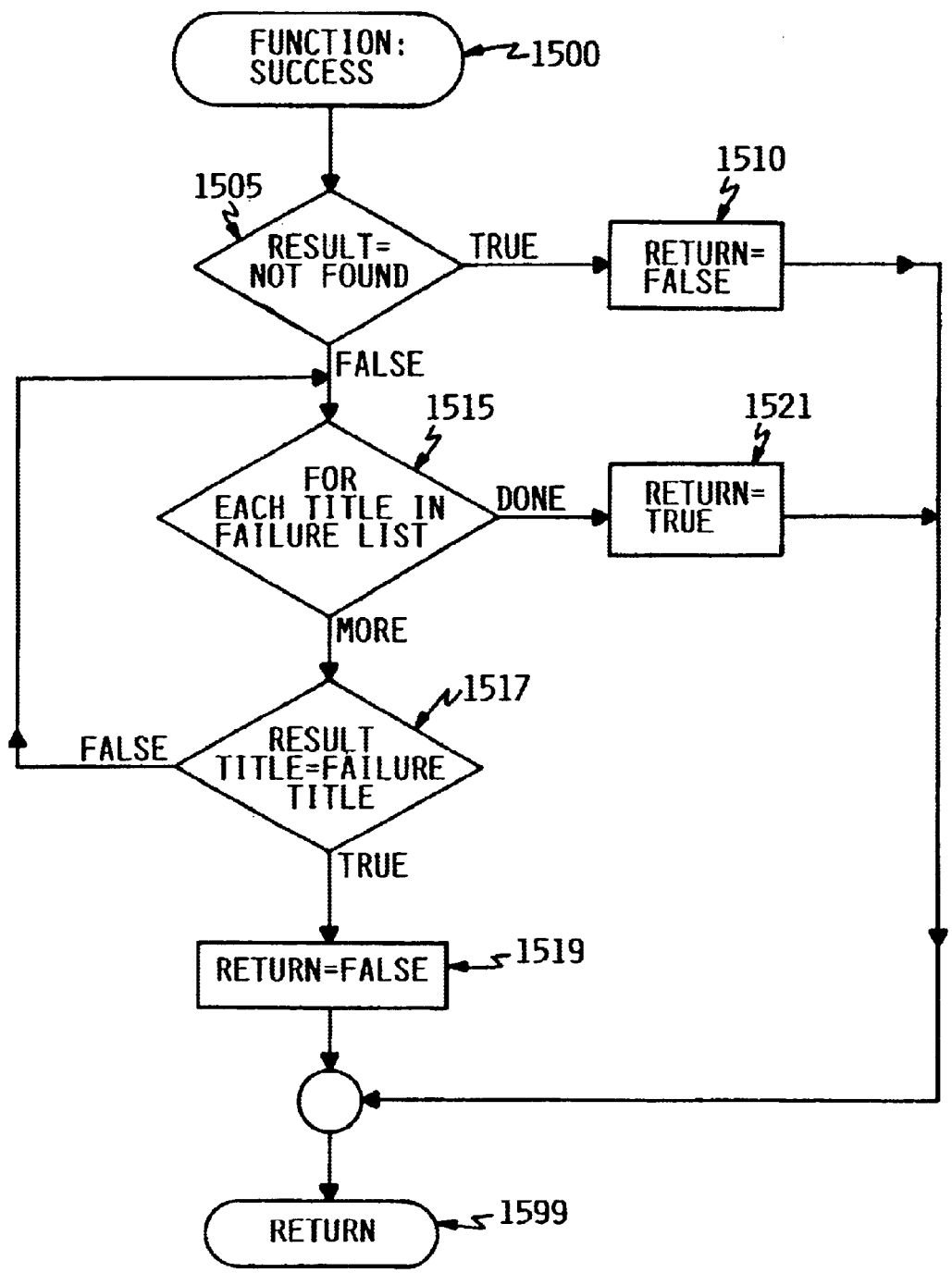

Referring to FIG. 15, there is illustrated sample logic for browser 399 that performs the success function. At block 1500, control begins. Control then continues to block 1505 where browser 399 determines whether the HTTP response message data returned from the server to the browser in response to the user's hypertext selection indicated that the requested URL was not found, that whether the URL was invalid because the file it specifies does not exist. If the determination at block 1505 is true, then control continues to block 1510 where browser 399 sets the return value of the success function to be false. Control then continues to block 1599 where the function returns.

If the determination at block 1505 is false, then control continues to block 1515 where browser 399 enters a loop that will check each title in failure messages 311 against the result returned from the server. If the result from the server matches one of the titles in failure list 311 then the loop exits from block 1517 to block 1519 where browser 399 sets the return value to be false and then returns this value at block 1599. If the data returned from the server is not found as one of the messages in failure list 311, then browser 399 exits from the loop at block 1515 to 1521 where browser 399 sets the return value of this function to be true and then returns at block 1599.

Figure 16:
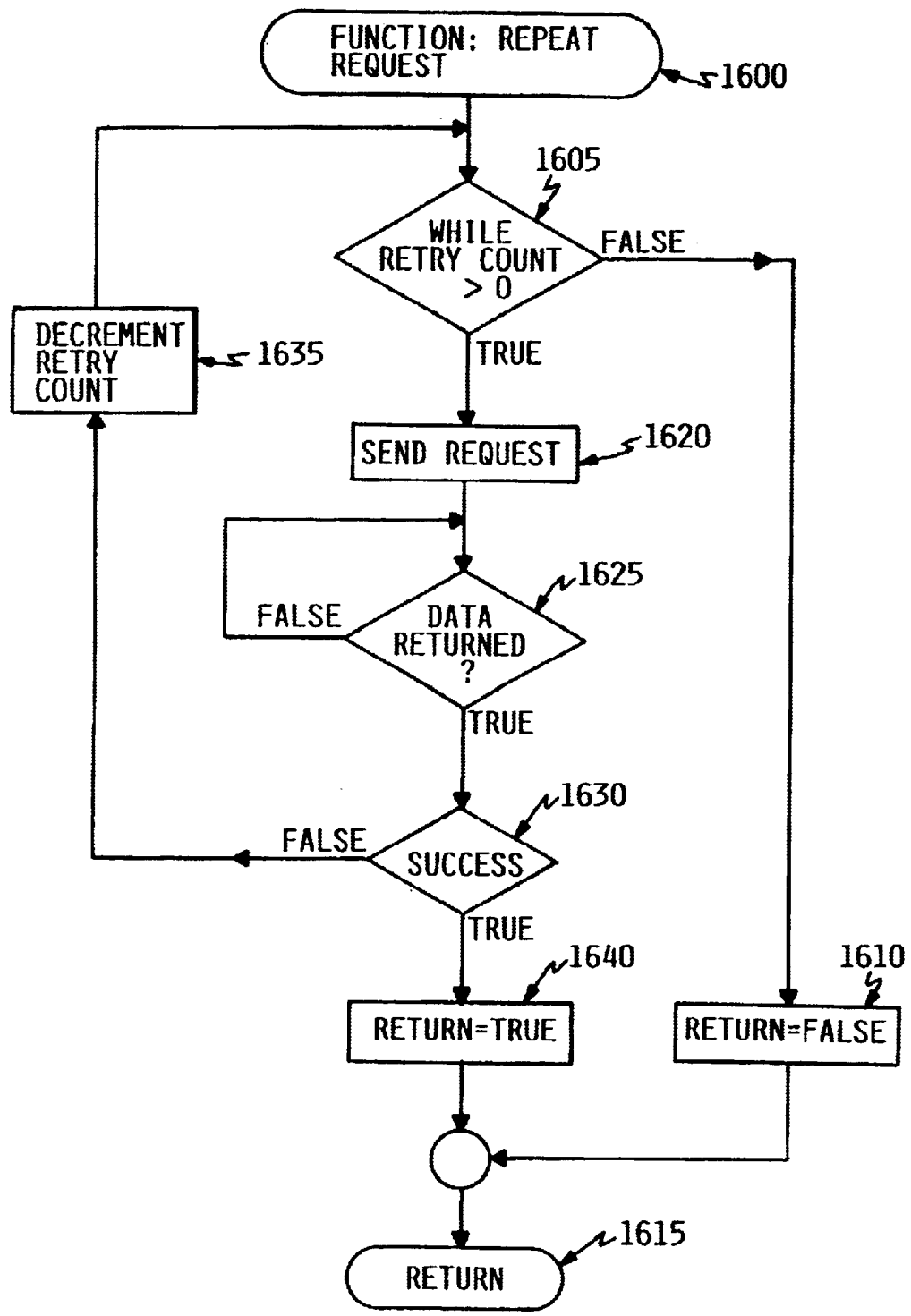

Referring to FIG. 16, there is illustrated sample logic for browser 399 that performs the repeat-request function. At block 1600, control begins. Control then continues to block 1605 where browser 399 determines whether the retry count is greater than zero. The retry count is a predetermined constant that determines the number of times that the request should be retried. If the determination at block 1605 is false, then control continues to block 1610 where browser 399 sets the return value for the function to be false and then continues to block 1615 where the function returns.

If the determination at block 1605 is true, then control continues to block 1620 where browser 399 retries the request. Control then continues to block 1625 where browser 399 waits until it receives data in response to the request that is sent at block 1620. When browser 399 receives data, then control continues to block 1630 where browser 399 determines if the request was successful.

If the determination at block 1630 is false, then control continues to block 1635 where browser 399 decrements the retry count and then returns to block 1605.

If the determination at block 1630 is true, then control continues to block 1640 where browser 399 sets the return value for the function to be true. Control then continues to block 1615 where the function returns.

Figure 17:
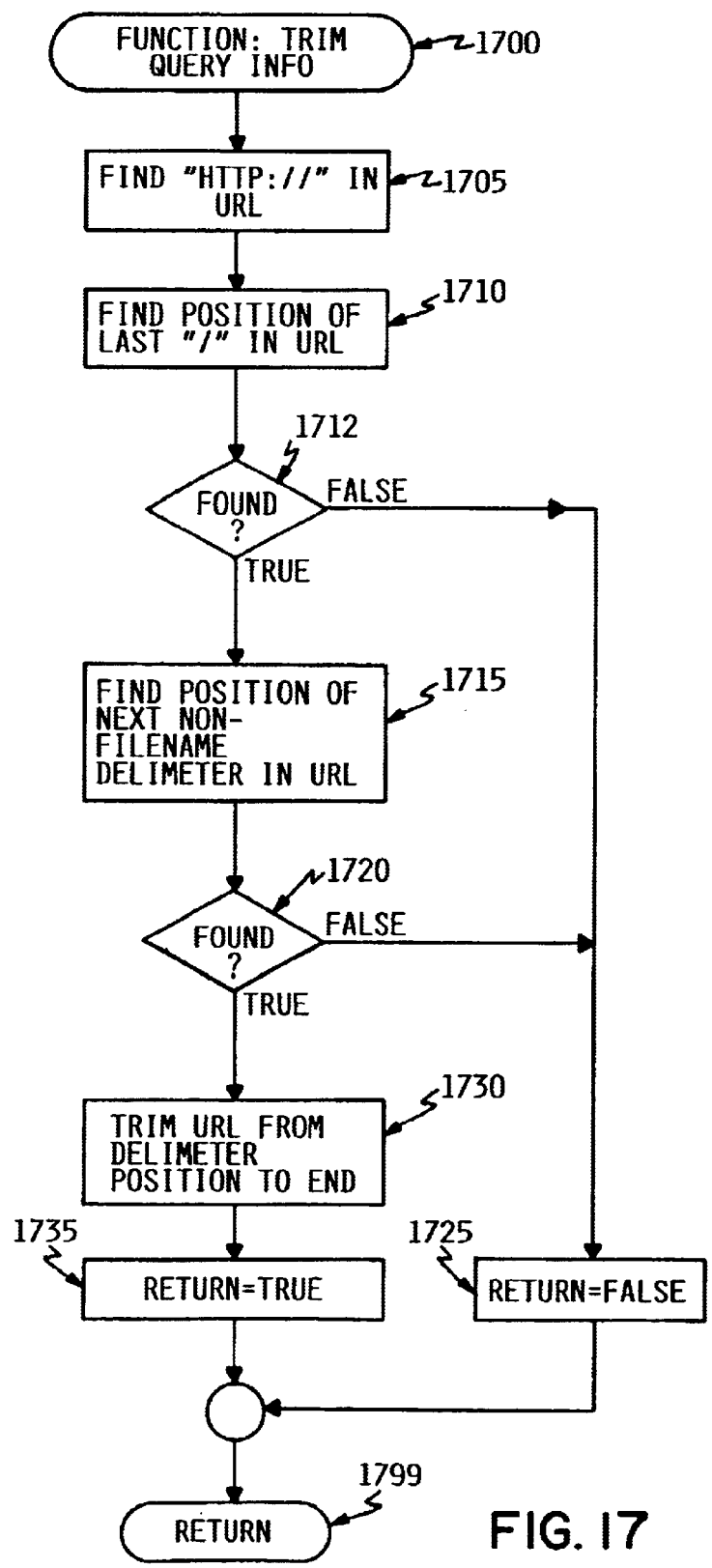

Referring to FIG. 17, there is illustrated sample logic for browser 399 that performs the trim-query-info function. At block 1700, control begins. Control then continues to block 1705 where browser 399 finds the string: "HTTP://" in the URL that the user previously requested. Control then continues to block 1710 where browser 399 searches for the position of the last "/" in the URL following the string found in block 1705. Control then continues to block 1712 where browser 399 determines whether the search done in block 1710 was successful. If the search was not successful, then control continues to block 1725 as further described below.

If the search done in block 1710 was successful, then control then continues to block 1715 where browser 399 finds the position of the next non-file-name delimiter (to the right of the last "/") in the URL. Control then continues to block 1720 where browser 399 determines whether the search that was executed at block 1715 was successful. If the determination at block 1720 is false, then control continues to block 1725 where browser 399 sets the return value for the function to be false. Control then continues to block 1799 where the function returns.

If the determination at block 1720 is true, then control continues to block 1730 where browser 399 trims the URL from the delimiter position found in block 1715 to the end of the URL. For example, block 1730 would trim query information that follows a question mark at the end of a URL. Control then continues to block 1735 where browser 399 sets the return value for the function to be true. Control then continues to block 1799 where the function returns.

Figure 18:
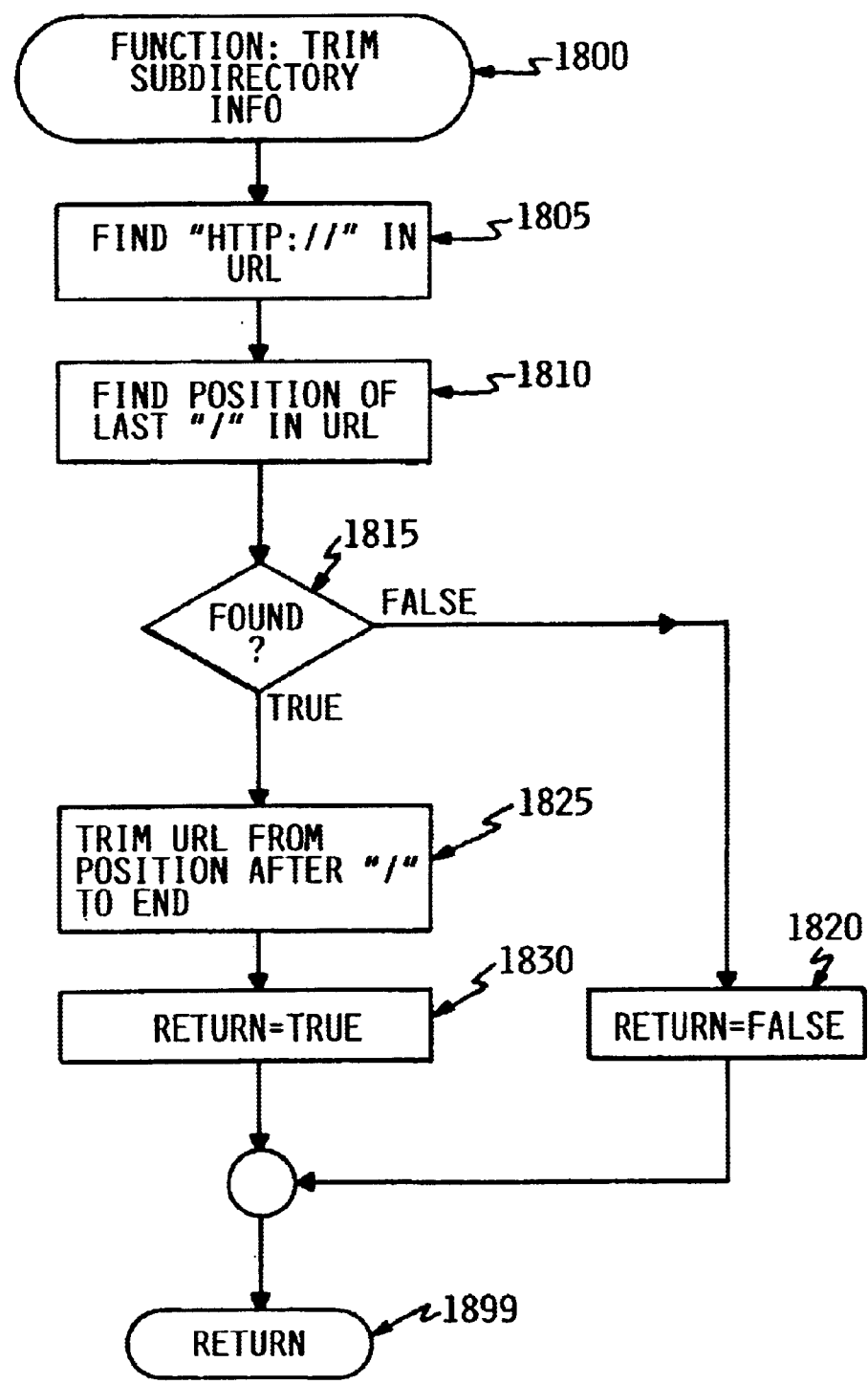

Referring to FIG. 18, there is illustrated sample logic for browser 399 that removes the narrowest portion of the path address in the URL. For example, the first time the function of FIG. 18 is called, it will remove the file name from the URL; the next time it will remove the narrowest subdirectory, and so on until only the server name remains. The subdirectories and directories will often times have a displayable web page associated with them, so trimming the URL in this way will often yield a valid URL that points to a valid web page even though the original, invalid URL pointed to a non-existent web page. At block 1800, control begins. Control then continues to block 1805 where browser 399 finds the string: "HTTP://" in the URL that the user requested. The purpose of the logic illustrated at block 1805 is to prevent the logic of blocks 1810 and 1825, below, from trimming the server name from the URL. Control then continues to block 1810 where browser 399 finds the position of the last "/" in the URL. Control then continues to block 1815 where browser 399 determines whether the search that was previously done in block 1810 was successful.

If the determination at block 1815 is false, then control continues to block 1820 where browser 399 sets the return value for the function to be false. Control then continues to block 1899 where the function returns.

If the determination at block 1815 is true, then control continues to block 1825, where browser 399 trims the URL from the last "/" position to the end of the URL. Control then continues to block 1830 where browser 399 sets the return value for the function to be true. Control then continues to block 1899 where the function returns.

While this invention has been described with respect to the preferred and alternative embodiments, it will be understood by those skilled in the art that various changes in detail may be made therein without departing from the spirit, scope, and teaching of the invention. For example, browsers may become widely employed in consumer applications such as operator panels for consumer electronics, appliances, and automobiles. Accordingly, the herein disclosed invention is to be limited only as specified in the following claims.

What is claimed is:

1. A method at a client for recovering from an invalid address, comprising:

sending a request to a server, wherein the request comprises an address;

receiving a response from the server, wherein the response comprises a message;

determining that the message indicates that the address is invalid;

altering the address to create a second address in response to the message; and sending a second request to the server, wherein the second request comprises the second address, wherein the determining step further comprises searching for the message in a user-selected list of error messages.

2. A client that recovers from an invalid address, comprising:

a processor;

memory coupled to the processor;

a browser residing in the memory and executing on the processor, wherein the browser sends a request to a server, wherein the request comprises an address, receives a response from the server, wherein the response comprises a message, determines that the message indicates that the address is invalid, alters the address to create a second address in response to the message, and sends a second request to the server, wherein the second request comprises the second address;

wherein the browser further searches for the message in a user-selected list of error messages.

3. A program product that recovers from an invalid address, comprising:

a browser that sends a request to a server, wherein the request comprises an address, receives a response from the server, wherein the response comprises a message, determines that the message indicates that the address is invalid, alters the address to create a second address in response to the message, and sends a second request to the server, wherein the second request comprises the second address; and signal-bearing media bearing the browser, wherein the browser further searches for the message in a user-selected list of error messages.

\* \* \* \* \*